(12) United States Patent
Hu et al.

(10) Patent No.: US 9,361,478 B2
(45) Date of Patent: Jun. 7, 2016

(54) MANAGING PERSONAL INFORMATION ON A NETWORK

(71) Applicants: AT&T Intellectual Property I, L.P., Atlanta, GA (US); AT&T Mobility II LLC, Atlanta, GA (US)

(72) Inventors: Qingmin Hu, Sammamish, WA (US); Brian Kevin Daly, Peachtree Corners, GA (US); Mark Edward Causey, Tucker, GA (US); Karen Mullis, Loganville, GA (US); Jamie Toren, Atlanta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/263,109

(22) Filed: Apr. 28, 2014

(65) Prior Publication Data

US 2014/0237206 A1    Aug. 21, 2014

Related U.S. Application Data

(63) Continuation of application No. 13/539,323, filed on Jun. 30, 2012, now Pat. No. 8,713,638.

(51) Int. Cl.
*G06F 21/62* (2013.01)
(52) U.S. Cl.
CPC .................................. *G06F 21/6245* (2013.01)
(58) Field of Classification Search
CPC ..... G06F 21/6245; G06F 21/62; G06F 21/60; G06F 21/00; G06F 19/322; H04W 12/00; H04W 12/02; H04W 112/02

USPC ............................................... 726/3; 713/182
See application file for complete search history.

(56) References Cited

U.S. PATENT DOCUMENTS

| | | | |
|---|---|---|---|
| 6,629,095 B1 | 9/2003 | Wagstaff | |
| 6,986,036 B2 | 1/2006 | Wang | |
| 6,996,589 B1 | 2/2006 | Jayaram | |
| 7,669,049 B2 | 2/2010 | Wang | |
| 7,716,242 B2 | 5/2010 | Pae et al. | |
| 7,853,786 B1 * | 12/2010 | Fultz et al. | 713/166 |
| 7,873,666 B2 | 1/2011 | Sauermann | |

(Continued)

OTHER PUBLICATIONS

Agrawal et al., "Managing Healthcare Data Hippocratically", Jun. 2004, ACM, pp. 1-2.

(Continued)

*Primary Examiner* — Matthew Smithers
(74) *Attorney, Agent, or Firm* — Hartman & Citrin LLC

(57) ABSTRACT

Devices, systems, and methods are provided for managing personal information by providing a centralized source or database for a user's information and enabling the user to regulate privacy levels for each information item or category of information. Templates are provided as a table of hierarchies or an onion layers model. Private information may be stored in an inner layer while public information may be stored in an outer layer, and multiple layers and categories can be defined and customized within the template. A requesting entity requests information via a disseminating server that acts as a gateway for authenticating, authorizing, and providing access to the requesting entity. The user may therefore control and regulate their online presence simply by monitoring who requests their information and adjusting privacy levels accordingly.

20 Claims, 6 Drawing Sheets

(56) References Cited

U.S. PATENT DOCUMENTS

| | | |
|---|---|---|
| 8,019,620 B2 | 9/2011 | Miller |
| 2004/0111622 A1* | 6/2004 | Schoenberg ................ 713/182 |
| 2008/0270802 A1* | 10/2008 | Ashley et al. ................ 713/184 |
| 2009/0106815 A1 | 4/2009 | Brodie et al. |
| 2009/0300512 A1 | 12/2009 | Ahn |
| 2009/0300716 A1 | 12/2009 | Ahn |
| 2010/0024042 A1 | 1/2010 | Motahari et al. |
| 2011/0145355 A1 | 6/2011 | Mattern |
| 2011/0271339 A1 | 11/2011 | Ellis |
| 2011/0302273 A1 | 12/2011 | Pfitzmann et al. |
| 2012/0331090 A1* | 12/2012 | Kimchi et al. ................ 709/217 |
| 2013/0291123 A1* | 10/2013 | Rajkumar et al. ............. 726/28 |
| 2014/0068257 A1* | 3/2014 | Burckard ..................... 713/166 |

OTHER PUBLICATIONS

U.S. Appl. No. 13/539,323 Office Action dated Jul. 12, 2013.
U.S. Appl. No. 13/539,323 Notice of Allowance dated Dec. 11, 2013.

* cited by examiner

MANAGING PERSONAL INFORMATION ON A NETWORK

CROSS-REFERENCE TO RELATED APPLICATION

This application is a continuation of and claims priority to U.S. patent application Ser. No. 13/539,323 filed Jun. 30, 2012, now U.S. Pat. No. 8,713,638, the entire contents of which are incorporated by reference herein.

BACKGROUND OF THE SUBJECT DISCLOSURE

1. Field of the Subject Disclosure

The subject disclosure relates to managing personal information on a network. More specifically, the subject disclosure relates to managing layers of permissions for various information items associated with a user.

2. Background of the Subject Disclosure

As the information age progresses, an increasing concern is privacy of personal information. For instance, many websites on the World Wide Web (WWW) require a user to input or submit personal information before providing content. This personal information, along with other data of a user such as pictures, videos, user preferences, etc. becomes subject to the control and domain of the website hosting such information. More importantly, this information is explicitly removed from the user's domain, as anyone who has submitted content to a website can confirm upon reading the terms and conditions. Further, users frequently electronically disseminate data to entities, such as medical records to insurance companies and medical professionals, or financial data to lenders, etc. This information is again under the dominion and control of the entity requesting such information. With increasing reports of security breaches of databases, phishing, and identity theft, the lack of control a user has over their own personal information is a growing cause for concern.

SUMMARY OF THE SUBJECT DISCLOSURE

The subject disclosure presents devices, systems, and methods for managing personal information by providing a centralized source or database for a user's information, and enabling the user to regulate privacy levels for each information item or category of information. Private information may be stored in an inner layer while public information may be stored in an outer layer, with the ability to define and customize multiple layers and categories within the database. A requesting entity requests information via a disseminating server that acts as a gateway for authenticating, authorizing, and providing access to the requesting entity. The user may therefore control and regulate their online presence simply by monitoring who requests their information and adjusting privacy levels accordingly.

In one example embodiment, the subject disclosure is a system including a server on a network, the server including at least one processor, and a computer-readable medium coupled to the processor, the computer-readable medium storing computer-executable instructions that are executed by the processor to perform operations including receiving an information item, the information item being associated with a user and including a preference, the preference identifying at least one of a privacy layer and a category, and storing the information item in a template associated with the user, wherein a communication device operated by the user is provided with an interface to customize a plurality of privacy layers and categories within the template for managing personal information on a network.

In another example embodiment, the subject disclosure is a method implemented on a server including at least one processor that performs operations including receiving a request for an information item from a requesting device, the information item being associated with a user and including a preference, the preference identifying at least one of a privacy layer and a category, the information item being stored in a template associated with the user, and disseminating, from the server, the information item to the requesting device.

In yet another example embodiment, the subject disclosure is a computer-readable medium coupled to a server on a network, the computer-readable medium storing computer-executable instructions that are executed by the server to perform operations including receiving a request for an information item from a requesting device, the information item being associated with a user and including at least one of a privacy layer and a category, authenticating the request, and converting the information item to a format based on a format requirement of the requesting device. The information item may be stored in a template having a plurality of privacy layers and categories that are definable via a user interface on a communication device operated by the user.

DETAILED DESCRIPTION OF THE SUBJECT DISCLOSURE

Figure 1:
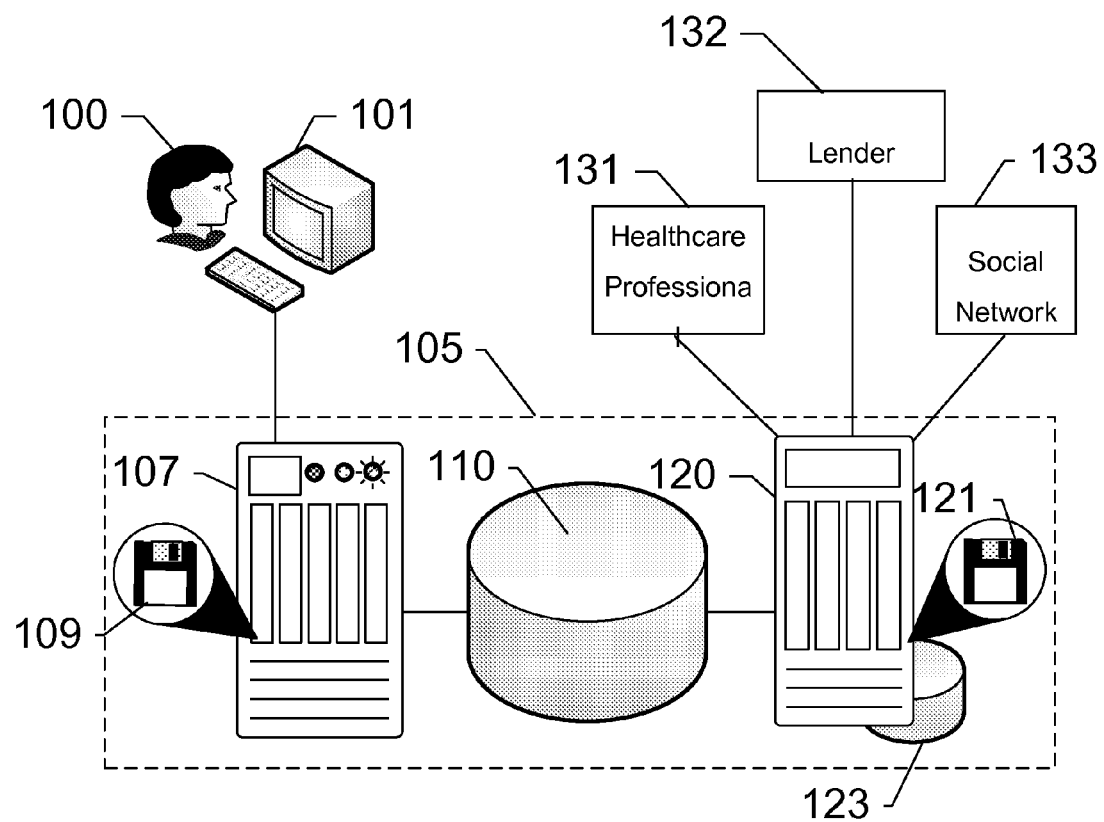
FIG. 1 shows a system for managing personal information on a network, according to an example embodiment of the subject disclosure.

The subject disclosure presents systems and methods for managing personal information on a network. A user's personal information may be stored on a database in communication with a server on a network. The personal information may be stored within a template associated with the user. A template may include various categories and privacy layers. Each privacy layer may have a different permission/trust level or key associated with it. The template may be user-defined or may be provided to the user by a service provider hosting the server. The template may be user-definable via an interface hosted on the server and accessible via a communication device operated by the user. A personal information item (or "information item") may be uploaded to the database by the user or by any other entity. The user may upload the information item along with a preference as to the category and the privacy layer of the information item. The privacy layer may correspond to a trust level of an entity requesting the information. The preference of category and/or privacy layer may be indicated using tags. An information item uploaded by any other entity via, for instance, a communication device operated by the entity, may be subject to the user's approval and preference. Upon receiving the information item and/or the user's approval, the server may store the information item in the appropriate section of the template on the database.

The server may include logic to disseminate the information item to a requesting entity. The dissemination logic may act as a gateway for receiving an information request from a device operated by the requesting entity, authenticating the requesting entity, and if the authentication is successful, disseminating or transmitting the information item to the device operated by the requesting entity. Alternatively or concurrently, the dissemination logic may simply allow the requesting entity access to the particular information item on the personal information database. The authentication may include comparing a key or other unique identifier included in the received information request with an authentication database. The key may be provided to the requesting entity at a time before the request is made, and may indicate a trust level of the requesting entity for the user. The key may grant the requesting entity access to the information item, and potentially to other information items sharing the same privacy layer of the requested information item. The server may further include conversion logic for converting a format of the information item. The conversion logic may be invoked based on a format requirement of the requesting entity. The format requirement may be defined in the authentication database or may be included in the information request. The information request may be submitted via an application programming interface (API). The information request may further be logged by the server, enabling the user to monitor a record of information requests and correspondingly adjust the privacy layers of their personal information items.

FIG. 1 shows a system for managing personal information on a network. The system may include a management server 107 on a network 105. The management server may include a management logic 109, or may be coupled to or in communication with a computer-readable medium, such as a memory, that stores logic 109 in the form of computer-executable instructions. Management server 107 may further be in communication with a personal information database 110 for storing personal information in a template associated with a user 100. User 100 operating a communication device 101 may access the personal information database 110 via an interface provided by the computer-executable instructions within management logic 109. For instance, server 107 may act as an application server, hosting an application accessible via communication device 101. At first, an operator of network 105 may contract with user 100 to enable access to personal information database 110, to enable customization of a template within personal information database 110, and to be able to disseminate information to selective entities via dissemination server 120. Setting up the service may include providing user 100 with a default template, including basic privacy layers and categories. User 100 may further be provided with instructions on how to customize the template, upload information, adjust privacy layers and categories, etc. A form may be provided to set up and customize the template, with a possibility of multiple forms, one for each category or type of information item. A user (or a third party) may upload or provision to database 110 information items including pictures, documents, health information, medical records, financial information such as taxes, etc., personal records such as passport details, birth certificates, etc., and commonly-used username/password combinations. The information item may be uploaded along with one or more preferences related to the privacy layer or category of the information item. For instance, a user may upload an image from their bachelor party that they wish only for their closest friends to be able to access. Instead of transmitting the image to a social network such as Facebook®, etc., the user may simply tag the photo as being "restricted" and upload the photo to server 107. Server 107 retrieves the "restricted" preference and stores the photo in the appropriate section of database 110.

Dissemination server 120 may act as a gateway to process incoming information requests from third parties such as a healthcare professional 131, a lender 132, or a social network 133. Dissemination server 120 may include logic 121 for receiving and processing requests, and an authentication database 123 for storing authentication information related to known requesting entities, to store information requests, etc. The user may specify trust levels for certain entities as being able to access information items within the "restricted" layer. Examples of trust levels include family, friends, colleagues, clients, and so on. The user may define a privacy layer for each trust level. The user may further provide, via server 120 or via any other mechanism, a key or other unique identifier to their closest friends. These friends may, either directly or via social network 133, attempt to access the photo stored on database 110. As further described below and with reference to FIG. 5, server 120 receives a request for an information item from these entities, determines that a key included within the request is authentic and matches the privacy layer of the item requested, and enables access to the item. The key may be authenticated by comparing it with a table of keys in authentication database 123. A record of the requesting entity, such as a friend on a social network, may be stored in authentication database 123. Similarly, a record for each entity 131-133 may be stored on authentication database 123, and used to authenticate the respective requesting entity. Alternatively, or if no such record is stored, the key is simply compared with a key table or other similar mechanism to authenticate the requesting entity.

Further, the request may include an indicator of a desired format for the request. For instance, financial records may be requested in a text-based format such as XML. A form or template may be included with the request, the template having readily identifiable fields for specific types of information such as credit card information, medical records, passwords, etc. Other data may be included within the request. Consequently, dissemination logic 121 may further include a conversion engine for converting a format of the information item into a format accessible for the particular requesting entity. The conversion engine may follow formatting requirements included in the request, or may retrieve pre-defined formatting requirements stored in authentication database 123. For instance, these pre-defined requirements may be provided on a contractual basis from one of requesting entities 131-133 at a time before any information is requested, such as the user signing up for an account with social network 133, etc. Any formatting requirements included in the request may further be saved in authentication database 123 for faster conversion the next time a request is received from that particular entity. Moreover, a template for most commonly used or popular entities may be predefined and stored by a service provider, in anticipation of a request for information from the particular entity. The conversion engine would only be invoked if a non-standard request is received.

Further, a record of the request is stored in a log on database 123 or another storage device. This log is accessible to user 100 via communication device 101 or any other device, and provides user 100 with historical insights on how often and by whom their personal information has been requested. User 100 may correspondingly modify the privacy layers for particular information items or categories. User 100 may further modify the entries in a key table or other authentication database stored on database 123. Modification of these entries enable user 100 to control and regulate privacy layers and/or trust levels for various entities, as well as being able to unsubscribe or completely block a particular entity simply by removing the associated entry from database 123. Further, since the user's personal information is never published externally but simply disseminated or granted access to, upon removing an entry or unsubscribing from a service provided by an entity, that entity will no longer have any control or access to the user's personal information stored in database 110.

Communication between the communication device 101 and network 105 may be accomplished via wired or wireless technology, such as WI-FI, cellular, broadband, etc. Consequently, communication device 101 may include appropriate transceivers, such as network adapters, subscriber identity module (SIM) or universal integrated circuit cards (UICC), etc. Further, communication devices such as device 101 or other devices operated by entities 131-133 may have more than one transceiver, capable of communicating over different networks. For example, a cellular telephone can include a cellular transceiver for communicating with a cellular base station, a WI-FI transceiver for communicating with a Wi-Fi network, and a BLUETOOTH® transceiver for communicating with a BLUETOOTH® device. Communication devices such as device 101 may further be equipped with the appropriate hardware and logic required to connect to a network. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On network 105, logic such as logic 109 and 121 may be programmed on a combination of servers and/or a complex of servers. A particular logic unit is not limited to a single logical location on the telecommunication network. Further, network 105 includes broadband wide-area networks such as cellular networks, local-area networks (LAN), and personal area networks, such as near-field communication (NFC) networks including BLUETOOTH®, or any combination thereof. A network typically includes a plurality of elements that host logic for performing tasks on the network.

Figure 2:
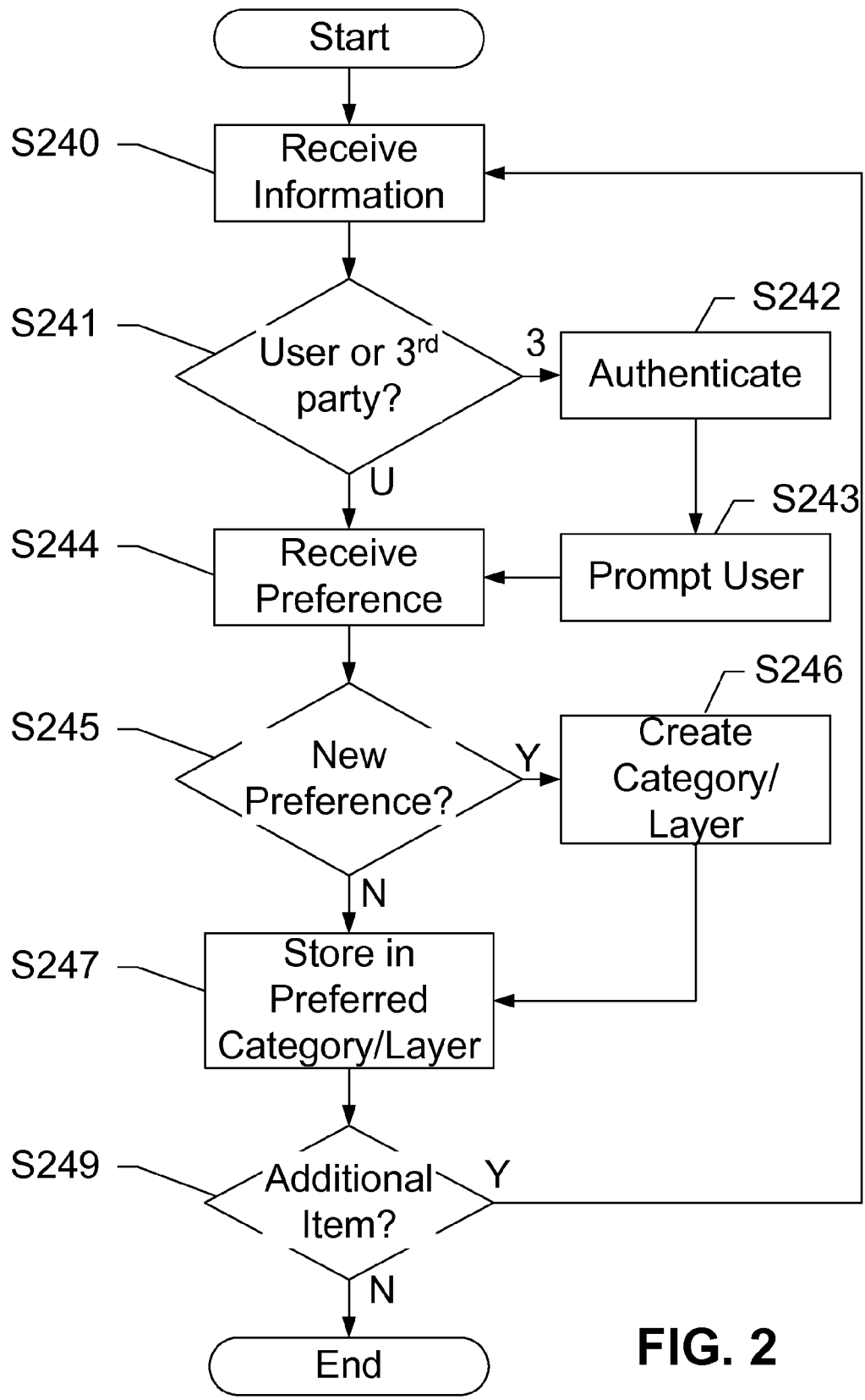
FIG. 2 shows a method for managing personal information on a network, according to an example embodiment of the subject disclosure.

FIG. 2 shows a method for managing personal information on a network, according to an example embodiment of the subject disclosure. This method may be executed among one or more servers on the network in communication with a personal information database storing the user's personal information items. The method may begin with a packet of information received S240 at the network. The information may be received S240 from a communication device operated by a user. The information may also be received from a third party. This determination is made at S241. For instance, a third party such as a radiology department of a healthcare organization may wish to provide the results of an X-ray or other test to the user. Alternatively, a user's spouse may wish to upload a photograph or other media item for the user. If the information is determined S241 to be provided from a third party, the third party is authenticated S242 before being allowed access to modify the user's database. This authentication S242 may include receiving a key or other unique identifier in the request from the third party, and comparing the key with a table or record of keys associated with the appropriate privacy layer.

Then, the user may be prompted S243 that an authenticated entity has provided new information to be stored in the user's personal database. This prompt S243 may be in the form of an electronic notification such as an email, text message, etc., and may include a request to the user to transmit his or her preferences for the information item. The preferences may include the user's selection of a privacy layer and/or a category for the information item. Other preferences may be provided. These preferences may be received S244 at the network. A determination may be made at S245 as to whether or not the preference is new. A new preference may be one that has not yet been defined in a customized template. If the preference is new, a new category or privacy layer may be created S246 in the user's template. This creation S246 may be as simple as allotting a particular folder or storage space for additional information items matching these preferences, or may include creating a new set of fields in a database having new permissions and associated keys for said information item. In either case, the received information item may be stored in the preferred category or layer S247. On the other hand, if no preference is defined, a default layer may be used. The default layer may be specified by the user as being open to the public, completely private until a preference is defined, or some combination thereof. The method may then end, unless it is determined S249 that an additional item is to be uploaded, in which case the method may return to the server receiving new information S240.

Figure 3:
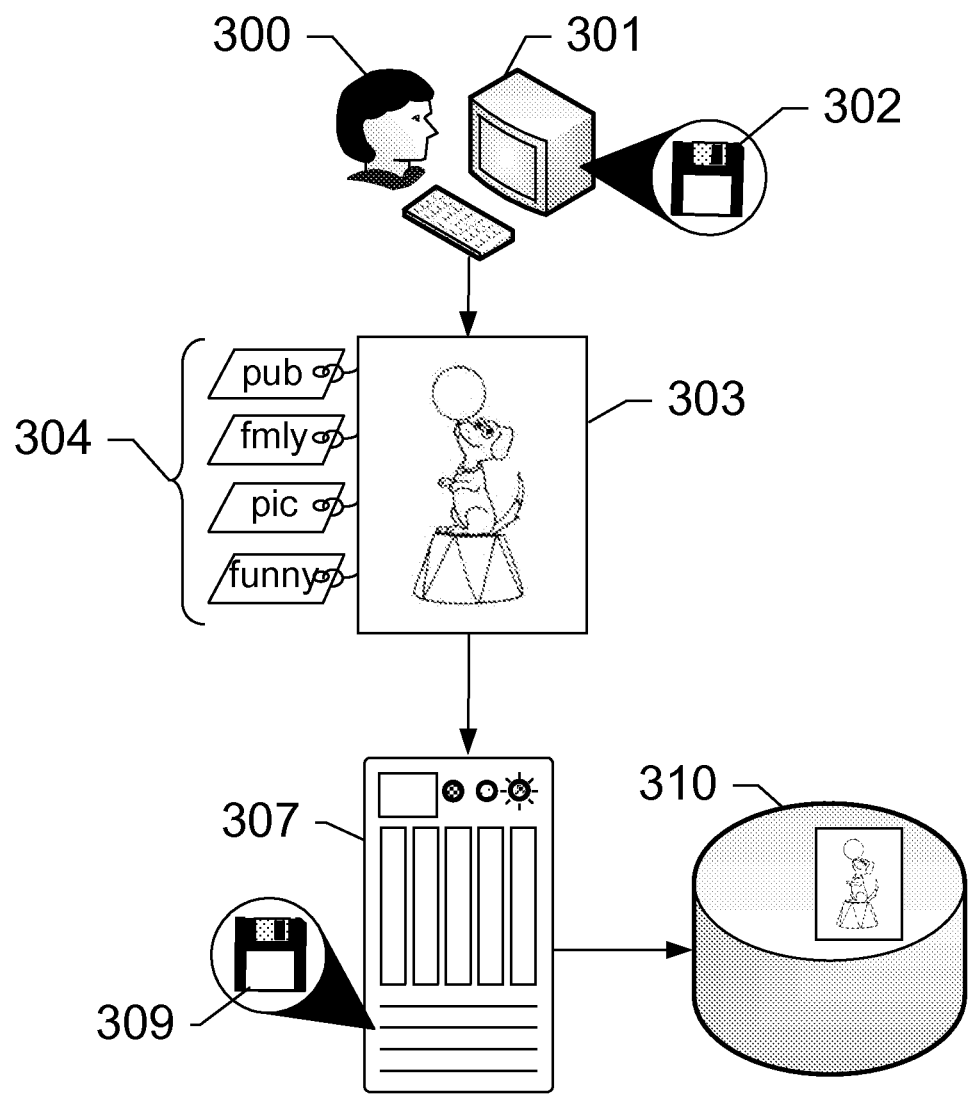
FIG. 3 shows an information item having a plurality of tags, according to an example embodiment of the subject disclosure.

FIG. 3 shows an information item having a plurality of tags, according to an example embodiment of the subject disclosure. User 300 may copy from external storage, a network, etc., an image 303 onto communication device 301. Alternatively, image 303 may exist elsewhere on a device in communication with communication device 301, such as on a digital camera connected via USB to communication device 301. In either case, user 300 may operate an interface provided via logic 302 to define a plurality of preferences associated with image 303. The preferences in this instance are shown in the form of tags 304, however, other means for identifying and selecting preferences may be possible via the user interface. In the present instance, the user has indicated preferences including "pub", "fmly", "pic", and "funny" in the form of tags 304. "Pub" may represent a privacy layer for the public. "Fmly" may represent a privacy layer for family. Consequently, image 303 is intended to be publicly viewable, as well as by the family members of user 300. Further, the tag "pic" indicates that this is a picture, and may be appropriately categorized in database 310. Finally, the tag "funny" may be an additional category indicated by the user, enabling picture 303 to be searched using that tag, or categorized in that portion of their template stored on database 310.

Image 303 may be uploaded via any means to server 307 on a network. Logic 309 on server 307 may receive image 303, and may parse the tags to determine how to store image 303. Further, logic 309 may be in communication with logic 302 via any means, and may even provide the interface viewed by user 300 on communication device 301. In either case, logic 309 may determine the appropriate category/privacy layer for image 303 based on tags 304, and may store the image in the appropriate portion of the user's template on personal information database 310. Logic 309 may also determine, as described above, that certain tags are new and appropriately create a new category or layer to house the new tags.

Figures 4A, 4B:
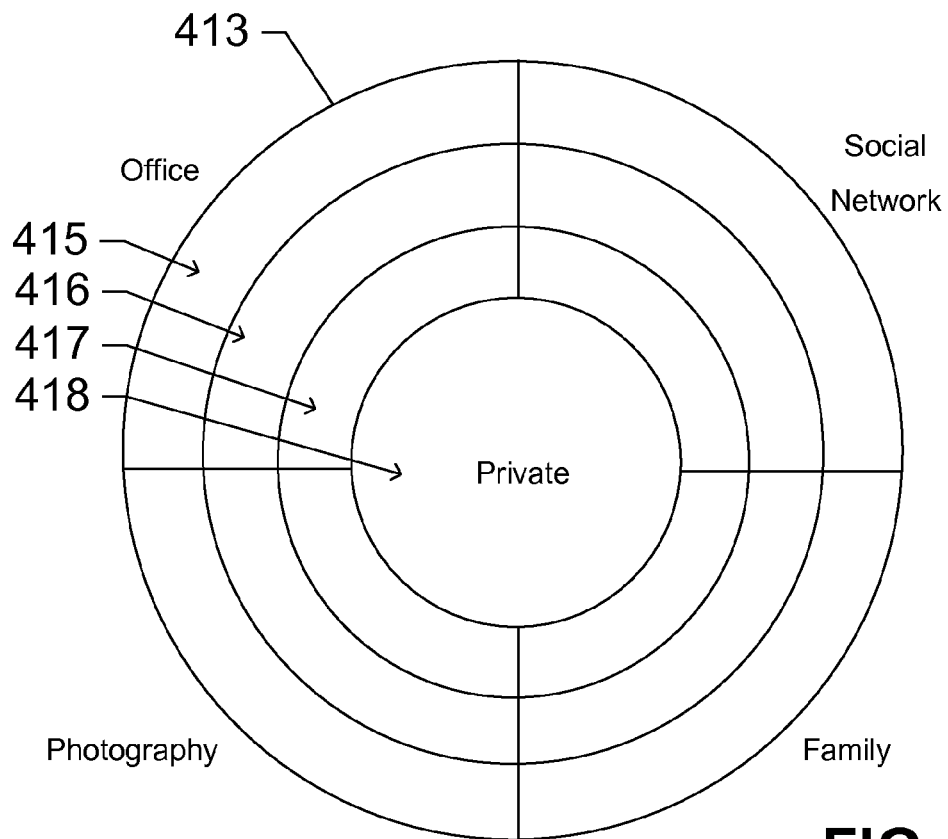
FIG. 4A shows a template for managing personal information on a network, according to an example embodiment of the subject disclosure.
FIG. 4B shows another template for managing personal information on a network, according to an example embodiment of the subject disclosure.

FIG. 4A shows a template for managing personal information on a network, according to an example embodiment of the subject disclosure. Template 411 may be stored on a personal information database associated with a user. Template 411 may be a default template provided to users who start a new service to manage their personal information, or may be created by a user using a form or other means for specifying their preferred privacy layers and categories. In this instance, template 411 includes three categories (professional, recreational, and personal), and four privacy layers (public, restricted, secured, and private). For instance, the "professional" category may be used to store any work-related correspondence, project data, etc. for the user, or the user's business entity. The "recreational" category may be used to store information to be shared with friends and family, or with other networks such as social networks, blogs, photo albums, etc. The "personal" category may be used to store personal information such as financial records, medical records, and other items that may be intended for a different purpose than the other two categories.

Within each category are four privacy layers. Information items may be uploaded and stored per category and in the appropriate privacy layer indicated by the user. For instance, picture 303 in FIG. 3 may be stored in the recreational category and within the public layer of privacy, as per the tags specified by the user. The restricted layer may be used to store items that are somewhat private, but not excessively so, such as family photos, memos, non-confidential correspondence, etc. The user may specify entities or groups of entities that are allowed access to the restricted layer, while the general public would be restricted access. The secured layer would be more private than the restricted layer, and may be used to store information for more specific purposes. For instance, confidential correspondence, intellectual property, or tax/medical records may be stored in this layer. To access secured information items, an entity may have to provide a specific key that may have been disclosed to the entity upon the user's choice. For instance, the user may have a family physician that may require access to certain medical records. Although these medical records may be secured and unavailable to the public, the physician may be provided with a key he can use to access this information at any time. Further, the user may specify conditions for access, such as time-limited access, or access from a particular network. These and other conditions may be specified by the user upon uploading the information item, upon customizing template 411, upon generating and providing the access key to the physician or other requesting entity, and any combination thereof. Finally, the private category may be completely inaccessible to anybody except for the users themselves. This category may be used to store highly personal information items that need not be disseminated to anybody. The user may use this category as a personal repository for any data or items that he or she may need access to at any time, a private cloud storage. Upon deciding that an information item needs to be shared with another entity, the user may re-assign that information item from the "private" category to the "secured" category.

FIG. 4B shows another template 413 for managing personal information on a network, according to an example embodiment of the subject disclosure. Template 413 is a circular or spherical model, with layers of privacy, reminiscent of an onion. The topmost layer 415 may be the most public, with layers 416 and 417 becoming increasingly more restricted and/or secured, with layer 418 being entirely private. Moreover, this model is shown as having four categories including "office", "social network", "photography", and "family". Each category may be defined by the user not only as a means for sorting his or her personal information, but also in anticipation of receiving requests from entities for specific information items. For instance, a co-worker or employer may request a timesheet. That request would be redirected to the "office" category, with any other category being excluded from the particular requesting entity. On the other hand, a photo blog hosting website may submit a request for a particular photograph captured by the user who happens to be an amateur photographer. This requesting entity may be granted access to one or more layers within the "photography" category, and excluded from any other category. Further, an entity requesting access to information at a particular layer may also be provided access to other more "relaxed" privacy layers. For instance, a social network that is granted access to privacy layer 416 may automatically be granted access to the less private layer 415. On the other hand, the user may limit this type of access and only provide access to single layers at a time.

Further, access to a particular layer 415-418 may include reading rights, reading and writing rights, deleting rights, or modification rights. These rights may be defined by the user upon creation of template 413 or upon providing the key to the requesting entity, and may be stored on the personal information database, authentication database, or in any storage in communication with the server hosting the personal information database.

Further, this type of model enables a user to create "avatars" or personas under which particular information items may be disseminated. In other words, a requesting entity may never know the true identity of a person, but simply an alternate identity, or a persona. For instance, a user's photographs taken as a result of his or her work as an amateur photographer may be stored under a unique personal identifiable merely as "photographer" (or other name of the user's choice). Any entity requesting information in this category would be provided a key to access one or more privacy layers of the photographer's work, without ever becoming privy to the actual identity of the user behind the persona. In another example, a social network may request contact information for the user without ever knowing the user's real name, since this information would be hidden behind an "avatar" presented to the social network. Consequently, many types of identity thefts may be prevented, since the unique ID associated with the user may be known only to the user and associated with the user's most secure information, while other information may be assigned to an avatar or persona without publicly being associated with the user's unique ID. This type of intelligent "avatar" generation may be created at an outermost layer of an onion model such as template 413, or any level of a template such as template 411. Further, an externally defined list of avatars may enable a user to network and communicate with other avatars created by other users. Exchanging information between avatars, particularly in the context of social networking, may ensure that identity theft, phishing, or even unregulated sale or dissemination of the user's information does not occur, or does not identify the user himself.

Figure 5:
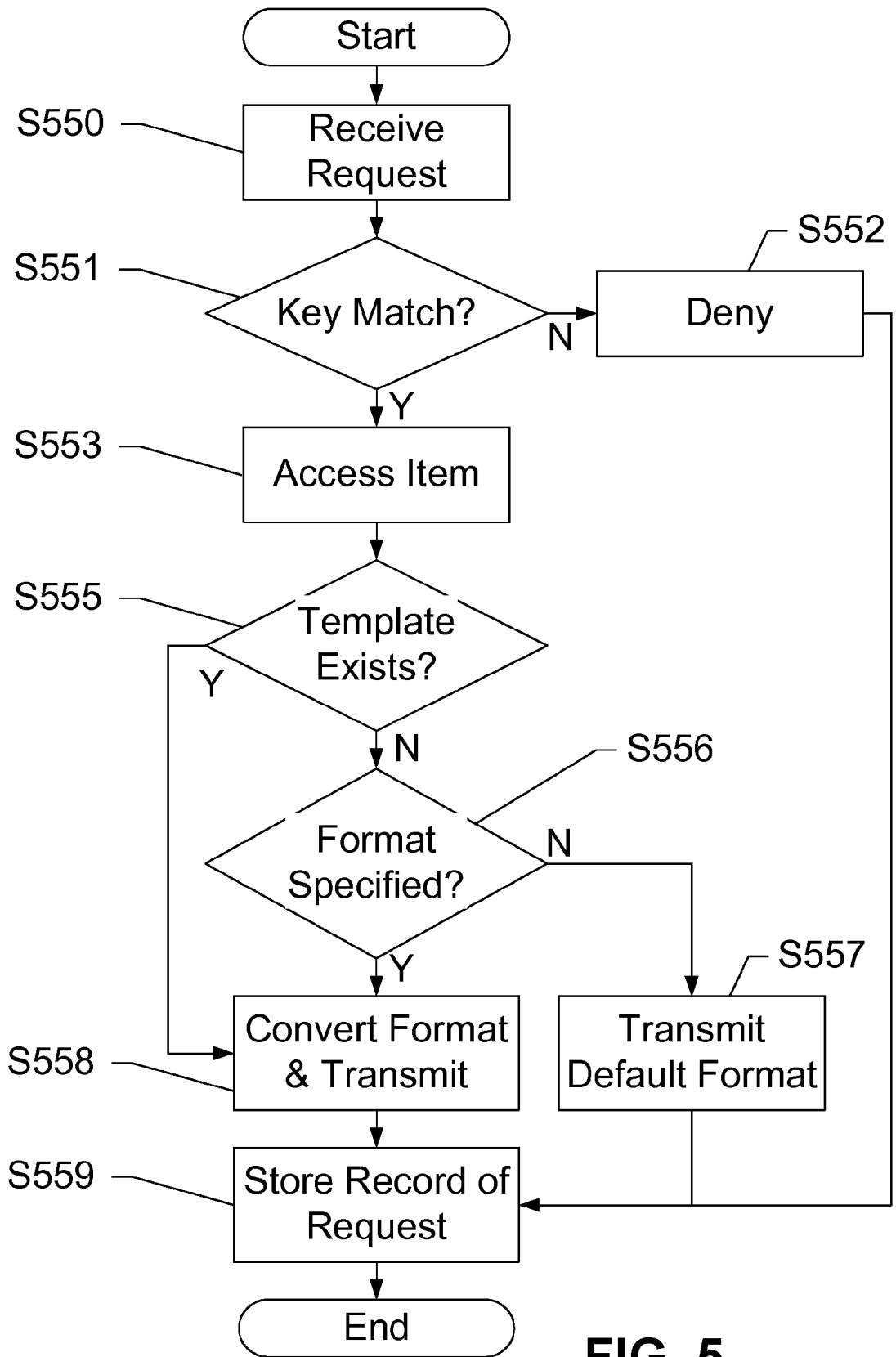
FIG. 5 shows a method for disseminating information to a requesting entity, according to an example embodiment of the subject disclosure.

FIG. 5 shows a method for disseminating information to a requesting entity, according to an example embodiment of the subject disclosure. The method may be implemented in the form of computer-readable instructions stored on a computer-readable medium coupled to or in communication with a dissemination server or other entities on the network. The computer-readable instructions may be executed by the server to perform operations including receiving an incoming information requests S550. The information request may be received from a network device, terminal, or server owned or operated by third parties such as a healthcare professional, a lender, social network, etc., and may include a key or other unique identifier. This key may be matched S551 with an authentication database storing authentication information related to known requesting entities. For instance, the user may specify trust levels for certain entities as being able to access information items within a particular privacy layer. The user may further provide via any mechanism the key or other unique identifier to these particular entities that are attempting to access the user's personal information. The key may be authenticated by comparing it with a table of keys in an authentication database. A record of the requesting entity, such as a friend on a social network, may be stored in the authentication database. Similarly, a record for any potential requesting entity may be stored on the authentication database and used to authenticate the respective requesting entity. Alternatively, or if no such record is stored, the key may simply be compared with a key table or other similar mechanism to authenticate the requesting entity. In either case, if it is determined that the key included within the request is not authentic or does not match the privacy layer associated with the item requested, the request may be denied S552. Further, a record of the request may be stored S559 enabling the user to view unsuccessful requests, and potentially take remedial measures, or just be satisfied that the authentication process has worked.

However, if the key match S551 authenticates and matches the privacy layer of the item requested, then the item may be accessed S553 from the user's personal information database. The requesting entity may have particular formatting requirements to convert the information item before dissemination. The dissemination logic may retrieve any record associated with the requesting entity S555 to determine whether or not such a requirement exists. For instance, the formatting requirement may be in the form of a template provided by the requesting entity at a time before the request is received S550. The template may be used as a guideline or instruction to convert the format of the information item S558 and to transmit the converted item to the requesting entity. If no template or pre-defined formatting requirement is available, then the request itself may be parsed to determine if it includes an indicator of a desired format for the request S556. For instance, financial records may be requested in a text-based format such as XML. A form or template may be included with the request, the template having readily identifiable fields for specific types of information such as credit card information, medical records, passwords, etc. In alternate embodiments, the request may be parsed S556 before a record of the requesting entity is checked for an existing template S555.

In either case, if no format is specified (whether predefined or included within the request), then a default or existing format may be used, and the item transmitted as is S557. Alternatively, the default format may be predefined by the service provider. If a format is specified in the request, the item may be converted into the specified format, and transmitted S558 similar to the case where a template exists S555. The conversion may occur using a conversion engine for converting the format of the information item into a format accessible for the particular requesting entity. Any formatting requirements included in the request may further be saved in an authentication database for faster conversion the next time a request is received from that particular entity.

Further, a record of the request may be stored S559 within a request log in communication with the dissemination server or another storage device. This log may be accessible to the user via any communication device, and provides the user with historical insights on how often and by whom their personal information has been requested, as well as which information items were requested, and which requests were denied in step S552. The user may correspondingly modify the privacy layers for particular information items or categories, by modifying the entries in a key table or other authentication database stored on the network. Modification of these entries may enable the user to control and regulate privacy layers and/or trust levels for various entities, as well as being able to unsubscribe or completely block a particular entity simply by removing the associated entry from the authentication database. Further, since the user's personal information is never published externally but simply disseminated or access granted, upon removing an entry or unsubscribing from a service provided by an entity, the entity may no longer have any control or access to the user's personal information.

Figure 6:
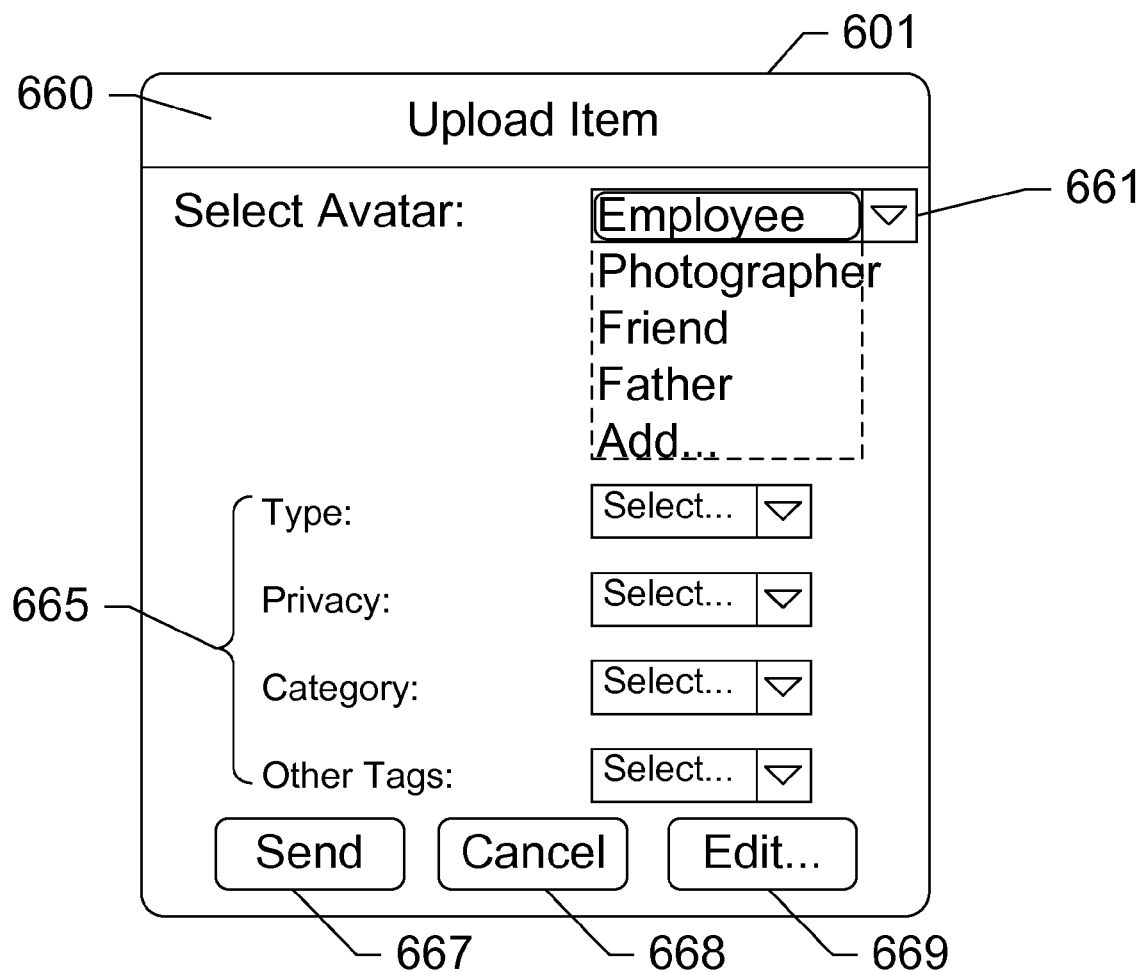
FIG. 6 shows a user interface for managing personal information, according to an example embodiment of the subject disclosure.

FIG. 6 shows a user interface for managing personal information, according to an example embodiment of the subject disclosure. User interface 601 may be displayed on any communication device operated by the user. The communication device may be in communication with a server over a network. The user interface 601 may display an "upload item" form 660. Form 660 may be provided by a management logic on the server, or may be hosted locally on the communication device. The communication device may be any network-capable computer having a display and input device. In some embodiments, the input device may be a touchscreen. In either case, the user may have selected an information item to be uploaded prior to launching form 660. The information item may include pictures, documents, health information, medical records, financial information such as taxes, etc., personal records such as passport details, birth certificates, etc., and commonly-used username/password combinations. Upon launching form 660, the user may select an avatar 661 to upload the item under. Depending on the avatar chosen, the item may automatically be categorized. Alternatively, the item may simply be associated with the particular avatar, with certain predefined permissions provided to selected entities, and privacy levels automatically assigned.

The user may further specify one or more preferences or attributes related to the information item. For instance, a user may upload an image from their bachelor party that they wish only for their closest friends to be able to access. Instead of transmitting the image to a social network such as Facebook®, etc., the user may simply tag the photo as being "restricted" and upload the photo to the server, which would retrieve the "restricted" preference and store the photo in the appropriate section of the personal information database. The user may specify detailed attributes for the item by selecting among tags 665. For instance, the user may specify a type of item (memo, photo, video), if the type is not automatically detected. The user may select a privacy level for the item. The user may also select a category for the item, and may tag the item with other tags such as descriptive keywords, etc., enabling the item to be searched for using that tag, or categorized in that portion of their template stored on the user's personal information database. Although the preferences in this instance are shown in the form of tags 665, other means for identifying and selecting preferences may be possible via the user interface.

The user may then activate the send button 667 to upload the image, cancel button 668 to cancel the upload, and edit button 669 to access more detailed settings, such as communication preferences, adding tags/avatars, etc. Upon activating send button 667, the information item may be uploaded via any means to a server on a network. Management logic onboard the server may receive the information item and the user's preferences, and determines how to store the information item based on the preferences. For instance, the logic may determine an appropriate category/privacy layer for the information item based on tags 665, and store the item in the appropriate portion of the user's template on the personal information database. The logic may also determine, as described above, that certain tags are new, and may appropriately create a new category or layer based on the new tags to store the item.

The user's personal information may not be limited to documents, pictures, and content that the user actively generates. The information may also include application usage data, system information for troubleshooting, cookies/breadcrumbs/other details, call detail records, location-based information, etc. Further, although active and intentional uploading of data has been described, automatic uploading of data may also be possible. For instance, application crash data may be automatically uploaded to the user's personal information database, so that it can be disseminated to developers and hardware/software manufacturers to improve their services. The user may be able to adjust the frequency, detail level, and privacy of this automated process. Other automatic processes may include browsing data, shopping data, spending habits, and other details that the user may wish to record but not necessarily disclose to other entities. The user may select to stop these automated processes at any time, or enable permission for only specific entities (such as for receiving coupons, rewards, and deals) to have access to this information. Other automated processes may include the dissemination logic observing trends in a pattern of request from a specific entity, and blocking or limiting the requesting entity if a deviation from the normal is determined. For instance, a social networking website may be hacked, and large amounts of personal data may be requested. In such a case, the system may automatically remove the listing of that social network from the authentication database.

Some purchase and account information such as credit card details may be uploaded once, and provided to merchants automatically, rather than typing in the information every time. Certain personal information such as geographic location, etc. may be generally private, but with access permanently available to emergency personnel such as ambulances, police, etc. For instance, police and rescue personnel may have a key that enables them to access the location, as well as being able to switch on and receive audio and video signals from the user's mobile device, features that would typically be maintained privately. Similarly, a child's information may be accessible at all times by a parent, whereas the parent's information may be subject to control and dominion of the parent, enabling the child to view only selected content.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A system comprising:
   a processor; and
   a memory storing instructions that, when executed by the processor, cause the processor to perform operations comprising
      receiving an information item associated with a user along with a preference associated with the information item,
      determining, based on the preference, a category layer for the information item and a privacy layer for the information item, and
      storing the information item in a portion of a template associated with the user, the portion of the template corresponding to the category layer and the privacy layer.

2. The system of claim 1, wherein the operations further comprise:
   receiving, from a requesting entity, a request for the information item;
   determining whether the request matches the privacy layer for the information item; and
   in response to determining that the request matches the privacy layer for the information item, providing the requesting entity access to the information item.

3. The system of claim 2, wherein providing the requesting entity access to the information item comprises transmitting the information item to the requesting entity.

4. The system of claim 2, wherein providing the requesting entity access to the information item comprises providing the requesting entity access to the information item on a database where the information item is stored.

5. The system of claim 2, further comprising:
   determining a pattern of requests from the requesting entity; and
   blocking the requesting entity from accessing information items associated with the user in response to determining a deviation from the pattern of requests from the requesting entity.

6. The system of claim 1, wherein the preference comprises a first tag associated with the category layer and a second tag associated with the privacy layer.

7. The system of claim 1, wherein the operations further comprise providing, to a communication device associated with the user, an interface comprising the preference, wherein the preference is selectable for association with the information item.

8. A method comprising:
   receiving, at a system comprising a processor, an information item associated with a user along with a preference associated with the information item;
   determining, by the system based on the preference, a category layer for the information item and a privacy layer for the information item; and
   storing, by the system, the information item in a portion of a template associated with the user, the portion of the template corresponding to the category layer and the privacy layer.

9. The method of claim 8, further comprising:
receiving, from a requesting entity, a request for the information item;
determining whether the request matches the privacy layer for the information item; and
in response to determining that the request matches the privacy layer for the information item, providing the requesting entity access to the information item.

10. The method of claim 9, wherein providing the requesting entity access to the information item comprises transmitting the information item to the requesting entity.

11. The method of claim 9, wherein providing the requesting entity access to the information item comprises providing the requesting entity access to the information item on a database where the information item is stored.

12. The method of claim 9, further comprising:
determining a pattern of requests from the requesting entity; and
blocking the requesting entity from accessing information items associated with the user in response to determining a deviation from the pattern of requests from the requesting entity.

13. The method of claim 8, wherein the preference comprises a first tag associated with the category layer and a second tag associated with the privacy layer.

14. The method of claim 8, further comprising providing, to a communication device associated with the user, an interface comprising the preference, wherein the preference is selectable for association with the information item.

15. A memory storing instructions that, when executed by a processor, cause the processor to perform operations comprising:
receiving an information item associated with a user along with a preference associated with the information item;
determining, based on the preference, a category layer for the information item and a privacy layer for the information item; and
storing the information item in a portion of a template associated with the user, the portion of the template corresponding to the category layer and the privacy layer.

16. The memory of claim 15, wherein the operations further comprise:
receiving, from a requesting entity, a request for the information item;
determining whether the request matches the privacy layer for the information item; and
in response to determining that the request matches the privacy layer for the information item, providing the requesting entity access to the information item.

17. The memory of claim 16, wherein providing the requesting entity access to the information item comprises transmitting the information item to the requesting entity.

18. The memory of claim 16, wherein providing the requesting entity access to the information item comprises providing the requesting entity access to the information item on a database where the information item is stored.

19. The memory of claim 16, wherein the operations further comprise:
determining a pattern of requests from the requesting entity; and
blocking the requesting entity from accessing information items associated with the user in response to determining a deviation from the pattern of requests from the requesting entity.

20. The memory of claim 15, wherein the operations further comprise providing, to a communication device associated with the user, an interface comprising the preference, wherein the preference is selectable for association with the information item.

\* \* \* \* \*